(12) United States Patent
Yamazoe

(10) Patent No.: US 8,161,272 B2
(45) Date of Patent: Apr. 17, 2012

(54) MEMORY CONTROL CIRCUIT AND INTEGRATED CIRCUIT INCLUDING BRANCH INSTRUCTION DETECTION AND OPERATION MODE CONTROL OF A MEMORY

(75) Inventor: Kiminari Yamazoe, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 495 days.

(21) Appl. No.: 12/318,211

(22) Filed: Dec. 23, 2008

(65) Prior Publication Data

US 2010/0005251 A1 Jan. 7, 2010

(30) Foreign Application Priority Data

Jul. 3, 2008 (JP) ................................. 2008-174635

(51) Int. Cl.
*G06F 9/00* (2006.01)
*G06F 1/32* (2006.01)
(52) U.S. Cl. ........................ 712/225; 713/323
(58) Field of Classification Search .................. None
See application file for complete search history.

(56) References Cited

U.S. PATENT DOCUMENTS

| 5,889,986 | A | * | 3/1999 | Nguyen et al. ................. 712/237 |
| 6,760,810 | B2 | | 7/2004 | Yamazaki et al. |
| 2003/0159004 | A1 | * | 8/2003 | Tsern et al. .................... 711/144 |
| 2004/0172518 | A1 | * | 9/2004 | Saruwatari et al. ........... 712/207 |
| 2008/0034234 | A1 | * | 2/2008 | Shimizu et al. ............... 713/320 |

FOREIGN PATENT DOCUMENTS

| JP | 4-254985 A | 9/1992 |
| JP | 10-283275 | 10/1998 |
| JP | 2002-196981 A | 7/2002 |
| JP | 2007-193433 | 8/2007 |

OTHER PUBLICATIONS

Japanese Office Action dated Mar. 3, 2009 with partial English-language translation.

* cited by examiner

*Primary Examiner* — Jacob A Petranek
(74) *Attorney, Agent, or Firm* — McGinn Intellectual Property Law Group, PLLC

(57) ABSTRACT

The memory unit is compatible with a plurality of operation modes. The plurality of operation modes include the normal mode allowing access and the standby mode consuming a lower power than the normal mode. The branch detection section detects a branch instruction from an instruction fetched from the memory unit by the CPU. The mode control section changes an operation mode of the memory unit according to a detection result by the branch detection section.

15 Claims, 9 Drawing Sheets

MEMORY CONTROL CIRCUIT AND INTEGRATED CIRCUIT INCLUDING BRANCH INSTRUCTION DETECTION AND OPERATION MODE CONTROL OF A MEMORY

BACKGROUND

1. Field of the Invention

The present invention relates to memory control and, particularly, to a memory control technique in a microcomputer.

2. Description of Related Art

Lower current consumption of electronic equipment is strongly demanded today for environmental consciousness and so on, and an attempt has been made to reduce the current consumption of a microcomputer incorporated in electronic equipment.

A technique disclosed in Japanese Unexamined Patent Application Publication No. 2007-193433 is described hereinafter with reference to FIG. 9. FIG. 9 corresponds to FIG. 1 of Japanese Unexamined Patent Application Publication No. 2007-193433. In a processor shown therein, a PC register 11 is a program counter and updates an address of an instruction to be executed at each cycle. The value of the PC register 11 is the address of the instruction to be executed, and the case where the instruction at the address exists in a cache memory 13 is a cache hit, and the case where it does not exist is a cache miss. In the case of the cache hit, an instruction decoder 15 decodes the instruction, and an execution device 16 executes an operation and updates the value of the PC register 11. In the case of the cache miss, on the other hand, the instruction indicated by the PC register 11 is downloaded from an external storage device 12 (memory) to the cache memory 13. Further, an instruction at a peripheral address is also downloaded to the cache memory 13 and cache replacement is performed.

At this time, a branch prediction device 14 performs a search to determine whether there is a branch instruction in the instruction for which the cache replacement has been performed. If there is a branch instruction, the branch prediction device 14 analyzes whether a branch destination instruction is the cache hit or the cache miss. If the analysis result shows that the branch destination instruction is the cache miss, the branch prediction device 14 performs cache replacement of the branch destination instruction and prepares for the future because the branch destination instruction is expected to exit in the external storage device 12. In this case, an operation waiting time occurs by access to the external storage device 12 upon cache replacement. The branch prediction device 14 calculates the time as a penalty and also calculates in how many cycles from the currently executed instruction the branch instruction will be issued, and sets a lower execution frequency of operation processing.

If, for example, the number of instructions to be executed until the branch instruction is issued is five and the penalty is twenty-five cycles, it is necessary to execute the five instructions within thirty cycles, thus reducing the execution frequency to ⅙. The power consumption of the processor is thereby reduced.

Further, with improvement in the function of small electronic equipment such as a portable terminal, a user program of a microcomputer incorporated therein is ever increasing. Accordingly, the size of a memory used in the microcomputer significantly increases, so that the power consumption of the memory forms an increasingly large proportion in the microcomputer.

Japanese Unexamined Patent Application Publication No. 10-283275 discloses a technique of reducing the current consumption of a microcomputer by lowering the current consumption of a memory.

The above technique monitors an address issued by a central processing unit (CPU), and sets the currently accessed memory bank only to a high power mode by activating it at a high power level and sets the other memory banks to a standby mode. This reduces the power consumption of the memory banks not being accessed, thereby reducing the power consumption of the whole memory and the microcomputer.

SUMMARY

The present inventors, however, have found the following problems. Although the technique disclosed in Japanese Unexamined Patent Application Publication No. 2007-193433 reduces power consumption by lowering the execution frequency of operation processing with use of the penalty that occurs at the time of cache replacement, the effect of reducing the power consumption of the microcomputer as a whole would be limited unless the power consumption of the memory itself is reduced.

Further, the technique disclosed in Japanese Unexamined Patent Application Publication No. 10-283275 monitors the address issued by the CPU, and sets the currently accessed memory bank only to the high power mode and sets the other memory banks to the standby mode. Thus, the timing when the memory bank in the standby mode changes to the high power mode is after the address is determined.

In order to change the memory from the standby mode to the high power mode, a starting time of the standby circuit occurs. Because the starting time is longer than a memory read access time, a waiting time occurs in memory access until the mode change is completed, which degrades the system processing performance.

A first exemplary aspect of an embodiment of the present invention is a memory control circuit. The memory control circuit includes a branch detection section and a mode control section.

The branch detection section detects a branch instruction from an instruction fetched from a memory unit having a plurality of operation modes.

The mode control section changes an operation mode of the memory unit according to a detection result by the branch detection section.

The implementation of the circuit according to the first exemplary aspect as an apparatus, a method or a system is also effective as another exemplary aspect of an embodiment of the present invention.

According to the technique of the present invention, it is possible to reduce the power consumption of a memory and prevent the degradation of processing efficiency in a microcomputer.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

Before describing exemplary embodiments of the present invention, principles of the present invention will be explained. It is noted that elements that are generally included in an integrated circuit (i.e. a microcomputer) to which the technique of the present invention is applicable but are less relevant to the description of the technique of the present invention are not described or illustrated for the sake of simplicity.

Figure 1:
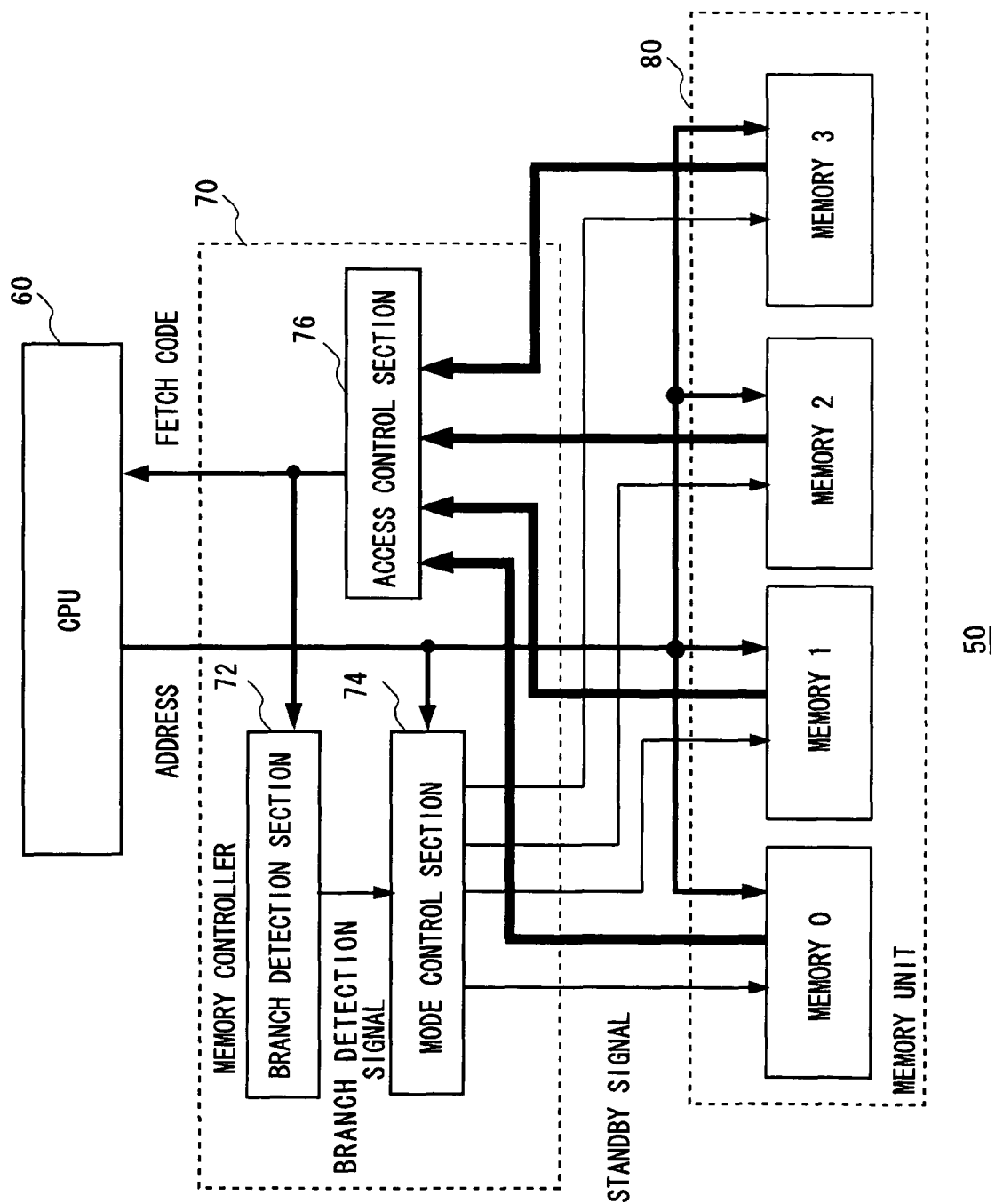
FIG. 1 is a block diagram of a microcomputer used to describe principles of the present invention.

FIG. 1 is a block diagram of a microcomputer 50 to which the technique of the present invention is applied. The microcomputer 50 includes a CPU 60, a memory controller 70, and a memory unit 80. The memory unit 80 includes a plurality of memories (which are four memories 0 to 3 in the example of FIG. 1).

The memory controller 70 includes a branch detection section 72, a mode control section 74, and an access control section 76. The access control section 76 functions as a memory controller in a general microcomputer. The branch detection section 72 and the mode control section 74 are characteristics of the technique of the present invention, and the detail of those are described later. Although those sections are included in the memory controller 70 by way of illustration, they may be placed separately from the memory controller 70.

Each of the memories 0 to 3 is composed of a nonvolatile memory cell, a sense amplifier, a charge pump and so on, and stores an instruction to be executed by the CPU 60, data to be used by the CPU 60 and so on at a corresponding address. Those memories have a normal mode, which is an operation mode that allows the CPU 60 to fetch an instruction from the memory, and a standby mode that consumes a lower power than the normal mode. There may be a plurality of kinds of the memory standby mode, and one example is that the sense amplifier and the charge pump are suspended. Further, the components of the memory are not limited to those described above, and the technique of the present invention may be applied in the same manner with use of a volatile memory, for example.

The branch detection section 72 monitors an instruction fetched from any of the memories 0 to 3 by the CPU 60 and detects if it is a branch instruction. In the case of prefetch, a plurality of instructions can be simultaneously fetched from the memory. In this case, the detection as to whether it is a branch instruction is detection as to whether a branch instruction is included. In the following description, "whether it is a branch instruction" and "whether there is a branch instruction" are used in the same meaning. Further, an instruction that is fetched (or prefetched) from the memory is referred to as a "fetch code", and an instruction different from a branch instruction is referred to as a "normal instruction".

Detection whether there is a branch instruction may be implemented by integrating a code of a branch instruction in a table and comparing the fetch code with the table, for example.

The branch detection section 72 outputs a branch detection signal indicating the presence or absence of a branch instruction to the mode control section 74 according to a result of the detection.

The mode control section 74 generates a mode control signal based on the branch detection signal from the branch detection section 72 and a branch destination address of a branch instruction and outputs the mode control signal to the memories 0 to 3, thereby controlling the operation mode of each memory. The branch destination address of the branch instruction is determined after decoding the branch instruction by the CPU 60. A standby signal is used as an example of the mode control signal. The standby signal includes standby signals 0 to 3 (not shown) corresponding respectively to the memories 0 to 3. The detail of the standby signal is described hereinafter together with a specific operation of the branch detection section 72 and the mode control section 74.

Figure 2:
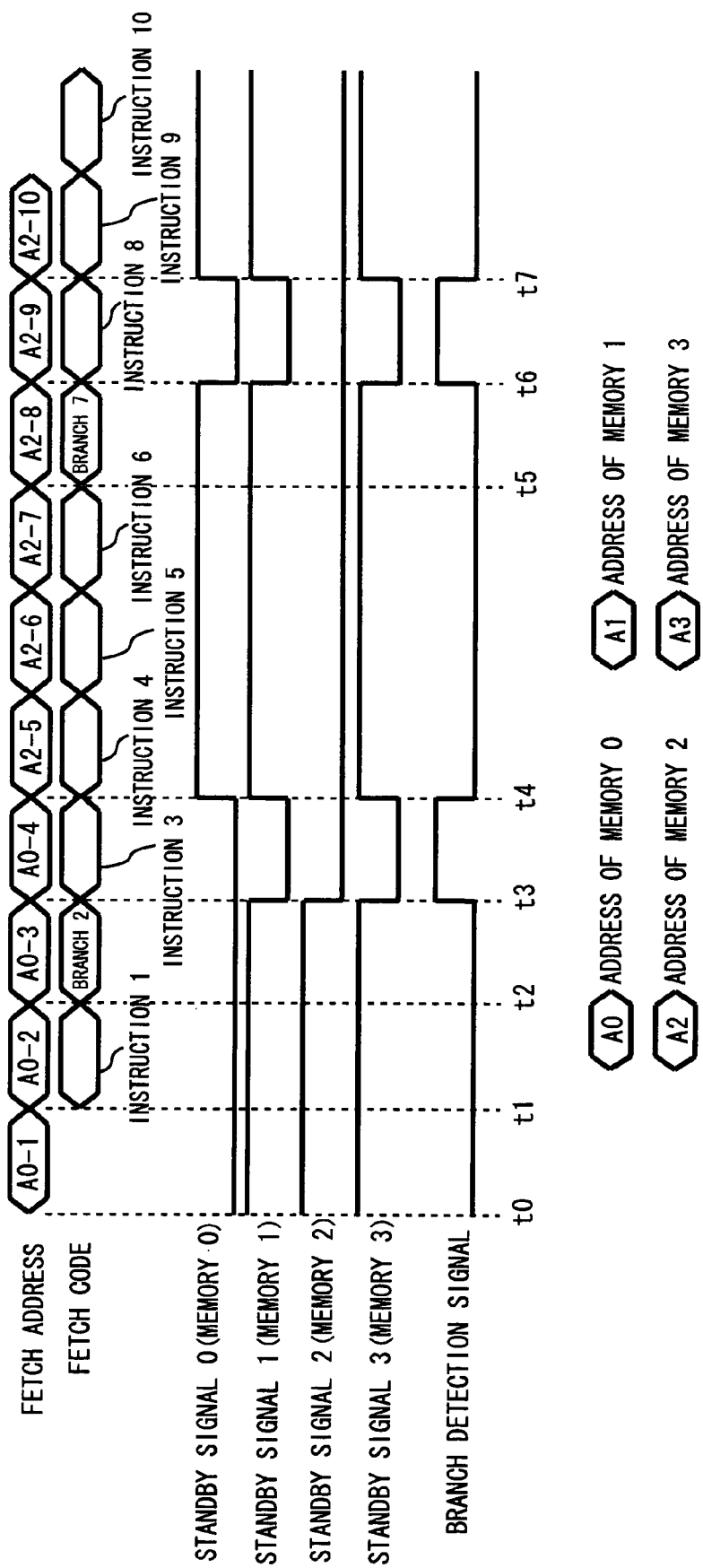
FIG. 2 is a timing chart showing an example of an operation in the microcomputer shown in FIG. 1.

FIG. 2 is a timing chart to describe the operation of the branch detection section 72 and the mode control section 74. In the example shown in FIG. 2, among the fetch addresses that are issued by the CPU 60, A0-1 to A0-4 are addresses of the memory 0, and A2-5 to A2-10 are addresses of the memory 2. Among the fetch codes, instruction 1, branch 2, instruction 3 and instruction 4 are instructions corresponding respectively to A0-1 to A0-4, and instruction 5, instruction 6, branch 7, instruction 8, instruction 9 and instruction 10 are instructions corresponding respectively to A2-5 to A2-10. The branch 2 is an instruction for a branch to the address A2-5, and the branch 7 is an instruction for a branch to the address A2-8. Although the branch 2 and the branch 7 may be any of a non-conditional branch and a conditional branch, a branch to the address A2-5 and a branch to the address A2-8 are determined after the CPU 60 fetches an instruction and performs processing such as decoding and execution of the instruction.

<Time t0>

As a result of the preceding processing, the standby signal 0 is inactive, and the memory 0 is in the normal mode. In the other memories, the standby signals are active, and those memories are in the standby mode.

The CPU 60 performs processing such as decoding and execution of the previously fetched instruction and makes a fetch request for an instruction at the address A0-1 to the memory 0 in the normal mode.

<Time t1>

As a result of the fetch at the address A0-1, the instruction 1 is read out from the memory 0 to the CPU 60 through the memory controller 70. Then, the CPU 60 makes a fetch request for an instruction at the address A0-2 to the memory 0 in order to fetch the next instruction. Further, the branch detection section 72 detects whether the instruction 1 is a branch instruction.

During time t1 to t2, the CPU 60 decodes and executes the instruction 1. The processing such as decoding and execution of the instruction is general pipeline processing performed by a CPU, and a detailed description of which is not provided.

<Time t2>

Because the instruction 1 is not a branch instruction, the branch detection section 72 does not output the branch detection signal. The branch detection signal thus remains inactive as shown in FIG. 2. Therefore, the standby signals 0 to 3 that are output from the mode control section 74 stay the same as those at time t0.

As a result of the fetch at the address A0-2, the branch 2, which is a branch instruction, is read out to the CPU 60. Then, the CPU 60 makes a fetch request for an instruction at the address A0-3 to the memory 0, and the branch detection section 72 detects whether the branch 2 is a branch instruction.

During time t2 to t3, the CPU 60 decodes and executes the branch 2.
<Time t3>

The CPU 60 makes a fetch request for an instruction at the address A0-4 to the memory 0.

Because the branch 2 is a branch instruction, the branch detection section 72 activates the branch detection signal. At the time when the branch detection signal becomes active, the mode control section 74 inactivates the standby signals 0 to 3 in order to change the operation mode of all the memories to the normal mode. The memories 1 to 3 thereby change from the standby mode to the normal mode, and the memory 0, which has been in the normal mode, remains in the normal mode.
<Time t4>

The CPU 60 decodes and executes the branch 2 that has been fetched at time t2 and finds that the branch destination is the address A2-5 of the memory 2, and thus makes a fetch request for an instruction at the address A2-5.

Further, because it is found that the branch destination of the branch 2 is the memory 2, the mode control section 74 sets only the memory 2 to the normal mode and sets the other memories 0, 1 and 3 to the standby mode. The mode control section 74 keeps the standby signal 2 inactive and activates the standby signals 0, 1 and 3. Further, the branch detection section 72 inactivates the branch detection signal.

The instruction 3 and the instruction 4 are instructions that are prefetched by the CPU 60 until the branch destination address of the branch 2 is determined, and they are discarded without being executed.

After that, the processing proceeds in the state where only the memory 2 is in the normal mode, and the mode control section 74 maintains the standby signals 0 to 3 in the state at time t4 until time t5.

At time t5, a branch instruction (branch 7) is detected again. The processing performed in the CPU 60, the branch detection section 72 and the mode control section 74 are the same as the processing from time t3 to t4 and not described repeatedly.

The memory control technique according to the present invention performs the detection whether the instruction fetched by the memory is a branch instruction in parallel with the processing such as decoding and execution of the instruction by the CPU. If it is a branch instruction, the technique sets the operation mode of all the memories to the normal mode and, at the time when the branch destination of the branch instruction is determined as a result of decoding by the CPU, the technique sets the memory of the branch destination to the normal mode and sets the other memories to the standby mode.

In this technique, one memory of a plurality of memories which the CPU accesses to fetch the next instruction is in the normal mode so that it allows the fetch, and the other memories are in the standby mode. It is thereby possible to reduce the power consumption of the memory unit as a whole. Further, all the memories enter the normal mode before the decoding of the branch instruction by the CPU ends and the branch destination address is determined. It is thereby possible to obtain a higher processing performance compared with a technique that changes the relevant memory from the standby mode to the normal mode after the branch destination address is determined.

Based on the above description, exemplary embodiments of the present invention are described hereinafter.

First Exemplary Embodiment

Figure 3:
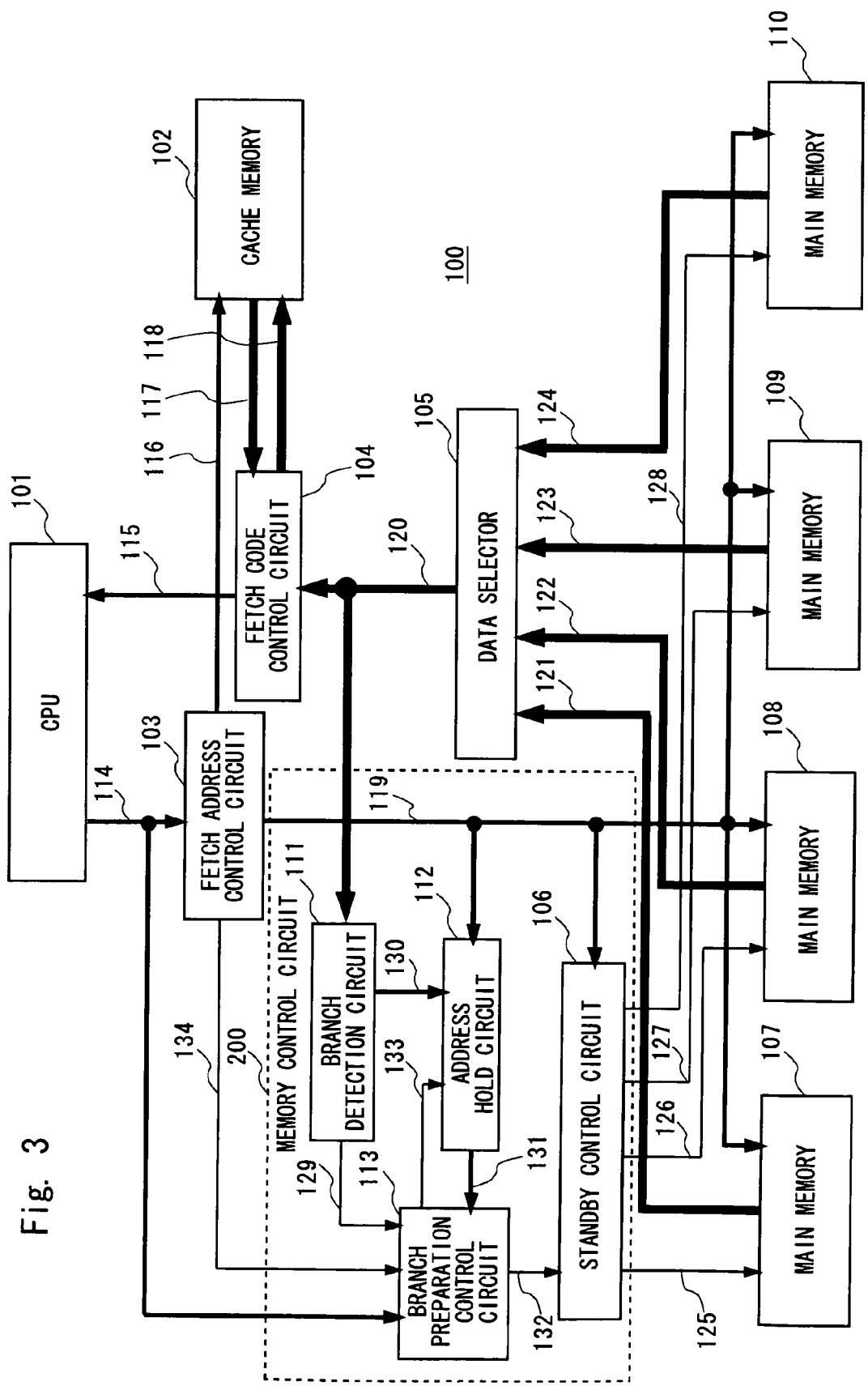
FIG. 3 is a view showing a microcomputer according to a first exemplary embodiment of the present invention.

FIG. 3 shows a microcomputer 100 according to a first exemplary embodiment of the present invention. The microcomputer 100 includes a CPU 101, a cache memory 102, and a plurality of main memories (main memories 107 to 110). The CPU 101 is connected to the cache memory 102 and each main memory via a fetch address control circuit 103, a fetch code control circuit 104, a data selector 105 and a memory control circuit 200.

The cache memory 102 is a general cache memory. The main memories 107 to 110 have a normal mode and a standby mode that consumes lower power than the normal mode, and it is set to either mode by the memory control circuit 200. In this exemplary embodiment, a circuit through which current constantly flows in the main memory is suspended as an example of the standby mode. When returning from the standby mode to the normal mode, a time to resume the operation of the suspended circuit in the main memory is generally longer than a read cycle. For example, it is assumed that a time needed to release the standby mode of the main memory corresponds to eight read cycles. Further, it is assumed that the CPU 101 can read codes of eight instructions at a time, and the operation frequency of the main memory is ½ of the operation frequency of the CPU 101.

The fetch address control circuit 103 outputs a cache address corresponding to a value on an instruction address bus 114 to a cache address bus 116 in response to a fetch request from the CPU 101, thereby fetching the instruction from the cache memory 102. The fetch address control circuit 103 also performs prefetch from the main memory, and upon prefetch, it reads a plurality of instructions corresponding to a higher-order address of an instruction address output from the CPU 101 into the cache memory 102 at a time. This is the same as a general fetch address control circuit having a prefetch function, and a detailed description is not provided.

In this exemplary embodiment, codes of eight instructions can be read from each main memory at a time, and the fetch address control circuit 103 fetches eight instructions at a time at the time of prefetch.

In this exemplary embodiment, the fetch address control circuit 103 outputs a fetch initialization signal 134 to the memory control circuit 200, besides the above processing. The fetch initialization signal 134 is activated only for the first cycle when the branch instruction is executed by the CPU 101.

The fetch code control circuit 104 and the data selector 105 perform the same operation as the ones that are generally included in a memory controller of a microcomputer having a main memory and a cache memory, and a detailed description is not provided.

Several terms and symbols are defined in order to facilitate the subsequent description.

When the CPU 101 makes a fetch request, it outputs an address of an instruction of a fetch target (fetch address) to the instruction address bus 114. In the following description, the "value on the instruction address bus 114" and the "fetch address" are used in the same meaning, and the symbol of the instruction address bus "114" is used also for the fetch address.

Upon prefetch, the fetch address control circuit 103 outputs a higher-order address corresponding to the fetch address to a main address bus 119. In the following description, the symbol of the main address bus "119" is used also for the higher-order address output to the main address bus 119.

A code that is output from the cache memory 102 to the CPU 101 flows through a cache read code bus 117 connected between the fetch code control circuit 104 and the cache memory 102. An instruction code that is output from the cache memory 102 to the cache read code bus 117 in response to a fetch request from the CPU 101 is referred to hereinafter as a "cache fetch code". The symbol of the cache read code bus "117" is used also for the cache fetch code.

An instruction code that is fetched from the main memory to be written to the cache memory 102 flows through a cache write code bus 118 connected between the fetch code control circuit 104 and the cache memory 102. The instruction code is referred to hereinafter as a "cache update code". The symbol of the cache write code bus "118" is used also for the cache update code.

An instruction code that is output from the main memory is supplied to the fetch code control circuit 104 and the memory control circuit 200 through the data selector 105 and a main code bus 120. An instruction code on the main code bus 120 is referred to hereinafter as a "main fetch code", and the symbol of the main code bus "120" is used also for the main fetch code.

The fetch code control circuit 104 outputs the main fetch code 120 or the cache fetch code 117 to the CPU 101 through a fetch code bus 115. An instruction code that flows on the fetch code bus 115 is referred to hereinafter simply as a "fetch code", and the symbol of the fetch code bus "115" is used also for the fetch code.

The memory control circuit 200 is described hereinbelow. The memory control circuit 200 includes a branch detection circuit 111, an address hold circuit 112, a branch preparation control circuit 113, and a standby control circuit 106. The branch detection circuit 111 corresponds to the branch detection section 72 in the microcomputer 50 shown in FIG. 1, and the other circuits correspond to the mode control section 74 in the microcomputer 50. The memory control circuit 200 is described hereinafter with reference to FIG. 4 showing the detailed configuration of the memory control circuit 200.

<Branch Detection Circuit 111>

The branch detection circuit 111 includes a table of a branch instruction code, and it performs detection as to whether a branch instruction code is contained in the main fetch code 120 that is output from the main memory through the data selector 105. If a branch instruction is contained in the main fetch code 120, the branch detection circuit 111 activates a branch match signal 129 to be output to the branch preparation control circuit 113 and outputs a branch instruction lower-order address 130 indicating a sequence order of the branch instruction in the main fetch code 120 to the address hold circuit 112.

Figure 4:
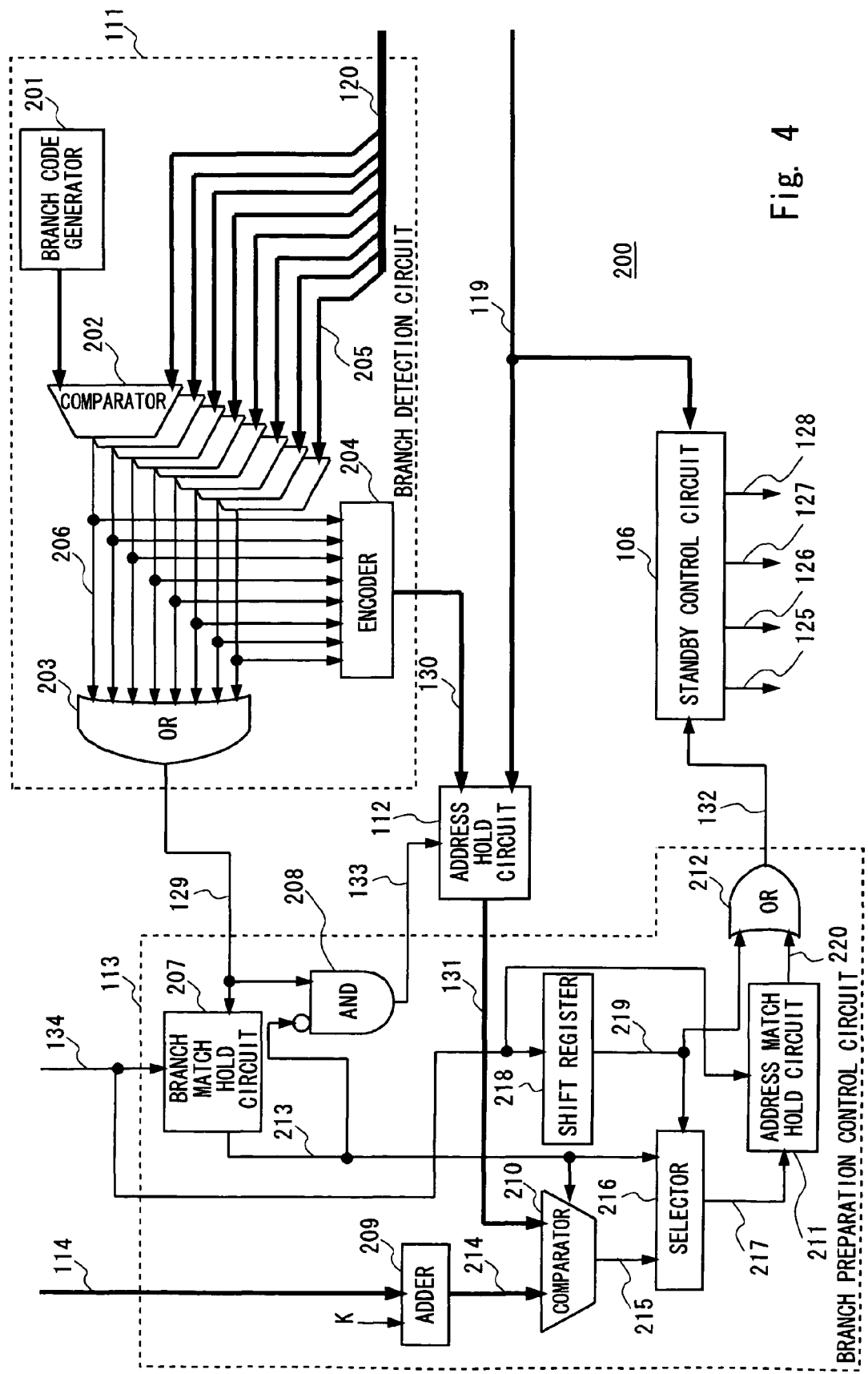
FIG. 4 is a view showing a memory control circuit in the microcomputer shown in FIG. 3.

Referring to FIG. 4, the branch detection circuit 111 includes a branch code generator 201, comparators 202, an OR circuit 203, and an encoder 204.

The branch code generator 201 includes a table of a branch instruction code and outputs the branch instruction code in the table to each of the comparators 202. The comparators 202 include comparators of the same number as codes included in the main fetch code 120 (which is eight instructions in this example). Each comparator compares the branch instruction code from the branch code generator 201 with an operation code 205 divided from the main fetch code 120 and outputs a branch match signal 206 indicating a comparison result to the OR circuit 203 and the encoder 204. The branch match signal 206 is active when the comparison result is "match" and it is inactive when the comparison result is "no-match".

The OR circuit 203 carries out a logical OR of the branch match signals 206 and outputs it as a branch match signal 129 to a branch match hold circuit 207. The branch match signal 129 is "0" (inactive) when a branch instruction is not detected and it is "1" (active) when a branch instruction is detected.

The encoder 204 encodes each branch match signal 206 and outputs a result to the address hold circuit 112. If a branch instruction is contained, an encoding result of the encoder 204 is the branch instruction lower-order address 130.

<Address Hold Circuit 112>

When an address hold enable signal 133, which is described later, is activated, the address hold circuit 112 generates a branch instruction address 131 based on the branch instruction lower-order address 130 from the encoder 204 and the higher-order address 119, and holds it until the address hold enable signal 133 is activated again.

When the address hold enable signal 133 is activated again, the address hold circuit 112 generates and holds a new branch instruction address 131. Thus, the address hold circuit 112 updates the branch instruction address 131 to be held each time the address hold enable signal 133 is activated.

The address hold enable signal 133 is output from an AND circuit 208 having inverting input, which is described later, in the branch preparation control circuit 113. As described in detail later in the description of the branch preparation control circuit 113, the address hold enable signal 133 is activated only when a branch instruction is detected for the first time from the main fetch code 120 and when the next branch instruction is detected after the start of execution of the detected branch instruction. Thus, when another branch instruction is detected before the execution of the branch instruction, the address hold enable signal 133 is not activated, and the address hold circuit 112 does not update the branch instruction address 131.

The branch instruction address 131 that is being held in the address hold circuit 112 is supplied to a comparator 210, which is described later, in the branch preparation control circuit 113.

<Branch Preparation Control Circuit 113>

The branch preparation control circuit 113 receives the branch instruction address 131 being held in the address hold circuit 112, the fetch address 114 requested from the CPU 101, the fetch initialization signal 134 output from the fetch address control circuit 103, and the branch match signal 129, generates a branch preparation signal 132 based on them and outputs it to the standby control circuit 106. The branch preparation control circuit 113 further has a function to output the address hold enable signal 133, which is described above, to the address hold circuit 112.

As shown in FIG. 4, the branch preparation control circuit 113 includes the branch match hold circuit 207, the AND circuit 208 having inverting input, an adder 209, the comparator 210, a selector 216, a shift register 218, an address match hold circuit 211, and an OR circuit 212.

The branch match hold circuit 207 receives the fetch initialization signal 134 that is activated only in the first cycle when the branch instruction is executed and the branch match signal 129 from the branch detection circuit 111, and outputs an address comparison signal 213. The address comparison signal 213 is activated when the branch match signal 129 is activated and it is reset when the fetch initialization signal 134 is activated. The address comparison signal 213 is input to the AND circuit 208 having inverting input, the selector 216, and the comparator 210.

The AND circuit 208 having inverting input carries out a logical AND between an inverted signal of the address comparison signal 213 and the branch match signal 129 to obtain the address hold enable signal 133.

The address comparison signal 213 is active only during a period until a branch instruction is detected for the first time from the main fetch code 120 and during a period after a branch instruction is detected until it is executed in the first cycle each time the branch instruction is detected from the main fetch code 120. Therefore, the address hold enable signal 133 is activated only when the branch instruction is detected for the first time from the main fetch code 120 and when the next branch instruction is detected after the start of execution of the detected branch instruction. Thus, when another branch instruction is detected before the execution of the branch instruction, the address hold enable signal 133 is not activated.

The address hold enable signal 133 is input to the address hold circuit 112, which is described earlier.

The adder 209 adds a predetermined value K (K is an integer of 1 or above) to the fetch address 114 to thereby obtain an added address and outputs it to the comparator 210. In this exemplary embodiment, the predetermined value is set in advance according to the number of cycles that is necessary for the main memory to return to the normal mode after the standby is released, which is eight in this example. The detail of the predetermined value K is described later.

The comparator 210 receives the added address 214, the branch instruction address 131 and the address comparison signal 213, and compares the added address 214 with the branch instruction address 131 while the address comparison signal 213 is active and outputs an address match signal 215 indicating a comparison result. Because the address comparison signal 213 is active from when a branch instruction is detected from the main fetch code 120 to when the execution of the branch instruction is started, the comparator 210 compares the added address 214 with the branch instruction address 131 during this period. The address match signal 215 is activated when the added address 214 and the branch instruction address 131 are the same and it is inactivated when the added address 214 and the branch instruction address 131 are different.

The address match signal 215 is output to the selector 216.

The shift register 218 shifts the fetch initialization signal 134 so that it is activated only for a branch latency and thereby obtains a fetch initialization shift signal 219. Thus, the fetch initialization shift signal 219 is active only for the period of branch latency from the first cycle when the branch instruction is executed by the CPU 101. The fetch initialization shift signal 219 is output to the selector 216 and the OR circuit 212.

The selector 216 selects either one of the address comparison signal 213 from the branch match hold circuit 207 and the address match signal 215 from the comparator 210 using the fetch initialization shift signal 219 from the shift register 218 as a selection signal and outputs the selected signal as an address match hold input signal 217 to the address match hold circuit 211. Specifically, upon selection, the selector 216 selects the address match signal 215 when the fetch initialization shift signal 219 is inactive and selects the address comparison signal 213 when the fetch initialization shift signal 219 is active.

The address match hold circuit 211 receives the address match hold input signal 217 from the selector 216 and the fetch initialization signal 134. The address match hold circuit 211 activates an address match hold output signal 220 when the address match hold input signal 217 is activated, and it inactivates and resets the address match hold output signal 220 when the fetch initialization signal 134 is activated.

The OR circuit 212 receives the fetch initialization shift signal 219 and the address match hold output signal 220 and outputs a logical OR between them to the standby control circuit 106.

Because the address match hold input signal 217 is active from when the address match signal 215 is activated to when the address comparison signal 213 is activated, the branch preparation signal 132 is active during this period.

Further, even when the fetch initialization signal 134 is activated and the address match hold output signal 220 is inactivated, because the fetch initialization shift signal 219 is active for the period of branch latency from that time, the branch preparation signal 132 is active during this period as well.

After that, when the fetch initialization shift signal 219 is inactivated, the branch preparation signal 132 is inactivated except for one exception.

The exception occurs when the fetch initialization shift signal 219 is activated before the fetch initialization signal 134 is activated. This is the case when a new branch instruction is detected before the start of execution of the previously fetched branch instruction. In such a case, the branch preparation signal 132 remains active even when the fetch initialization shift signal 219 corresponding to the previous branch instruction is inactivated. Then, the branch preparation signal 132 is inactivated when the fetch initialization shift signal 219 corresponding to a newly detected branch instruction is inactivated.

<Standby Control Circuit 106>

The standby control circuit 106 receives the current higher-order address 119 and the branch preparation signal 132, and controls the operation mode of each main memory. Specifically, when the branch preparation signal 132 is active, the standby control circuit 106 inactivates main memory standby signals 125 to 128 so as to release the standby of all main memories. Further, when the branch preparation signal 132 is inactivated, the standby control circuit 106 maintains the normal mode of the main memory corresponding to the higher-order address 119 by keeping the relevant main memory standby signal inactive, and changes the operation mode of the other main memories to the standby mode by activating the relevant main memory standby signals.

The operation of the memory control circuit 200 is collectively described hereinafter with reference to FIG. 5, for each of five possible states of the microcomputer 100 related to the fetch operation.

The fetch operation performed by the CPU 101 involves "normal fetch" and "branch fetch". The "normal fetch" indicates the operation that the CPU 101 sequentially fetches instructions stored at sequential addresses in the same memory. The "branch fetch" indicates the operation that CPU 101 fetches an instruction at an address not sequential to the address of the previously fetched instruction in the same memory or fetches an instruction in a memory different from the memory in which the previously fetched instruction is stored.

Further, when the currently performed fetch is any of the "normal fetch" and the "branch fetch", there is a case where a branch instruction is detected but not yet fetched. Such a case is referred to as "with branch". On the other hand, a case where there is not a branch instruction that is detected but not yet fetched is referred to as "without branch".

Further, during the normal fetch in the state of "with branch", there is a period to release the standby of all the main memories to prepare for access to the branch destination main memory that is made upon start of execution of the branch instruction. The state of this period is referred to as "branch preparation".

By combination of the above cases, there are five possible states as follows.

State 1: "normal fetch (without branch)"

This is the state where the CPU 101 performs the normal fetch and there is no branch instruction that is prefetched from the main memory and not yet fetched.

State 2: "normal fetch (with branch)"

This is the state after a branch instruction is detected from an instruction code prefetched from the main memory and until the standby release of all the main memories is made.

State 3: "normal fetch (branch preparation)"

This is the state after the standby release of all the main memories is made and until the execution of a branch instruction is started in the case of "with branch". A transition to this state can be made from the state 2 described above and the state 5 described below.

State 4: "branch fetch (without branch)"

This is the state where the CPU 101 performs the branch fetch and a branch instruction is not detected from an instruction code prefetched from the main memory.

State 5: "branch fetch (with branch)"

This is the state where the execution of the branch instruction is started in the state 3 and a fetch instruction is detected also from an instruction code prefetched from the memory with the branch destination address of the branch instruction.

The above five states make a transition to one another according to the fetch operation.

Figure 5:
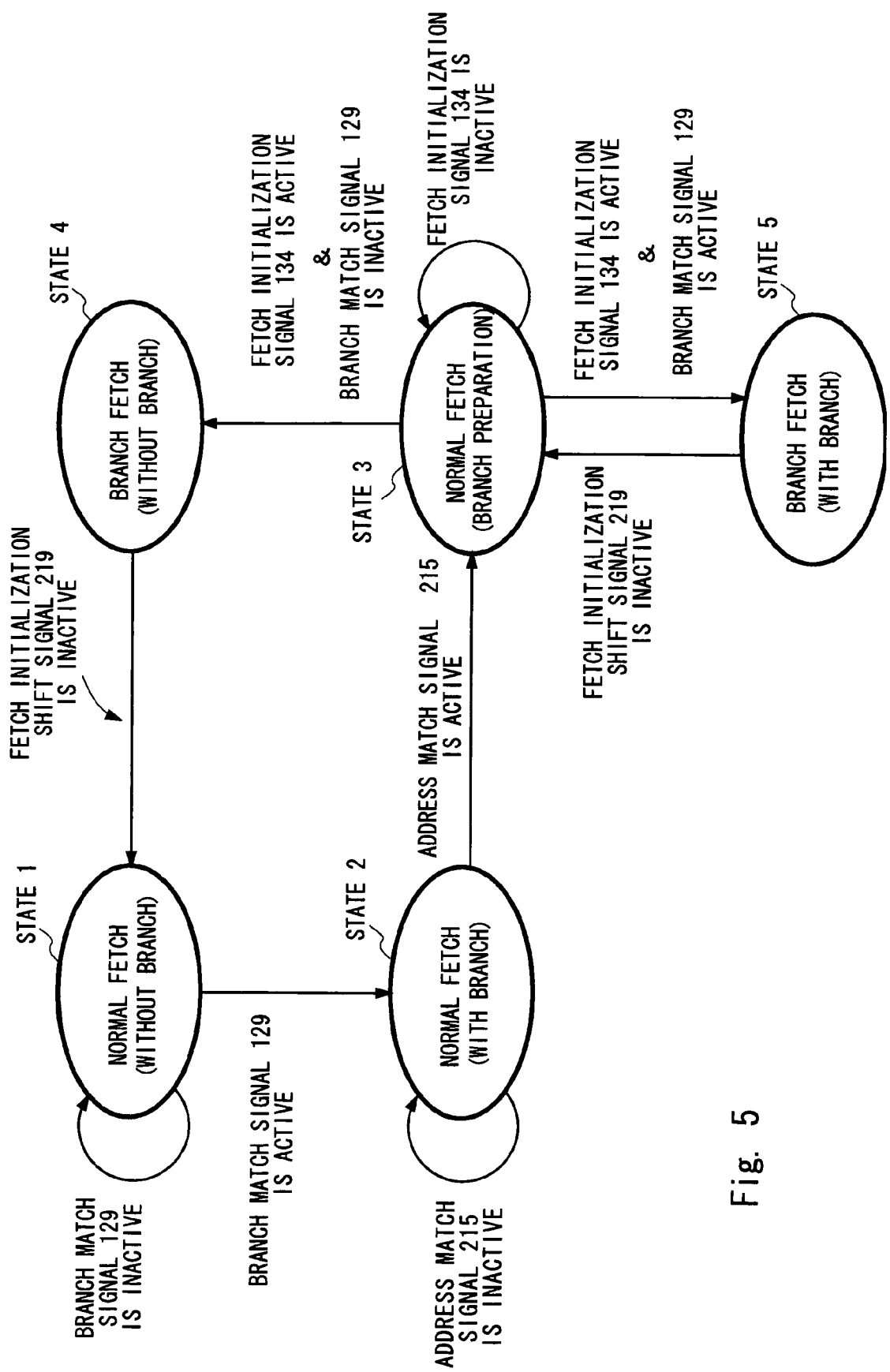
FIG. 5 is a view showing five states related to a fetch operation of a CPU.

As shown in FIG. 5, in the state 1 of "normal fetch (without branch)", the state 1 is maintained unless a fetch instruction code is detected from an instruction fetched from the main memory, i.e. unless the branch match signal 129 is activated. On the other hand, when the branch match signal 129 is activated in the state 1, the state is changed to the state 2 of "normal fetch (with branch)".

In the state 2, the state 2 is maintained until the address match signal 215 is activated. The address match signal 215 is activated when the added address 214 obtained by the adder 209 and the branch instruction address 131 held by the address hold circuit 112 match. Further, because the added address 214 is obtained by adding the predetermined value K to the current fetch address 114, the added address 214 and the branch instruction address 131 match at the timing that is K cycles before the cycle when the decoding of a branch instruction corresponding to the branch instruction address 131 is completed and the execution of the branch instruction is started by the CPU 101.

In the first cycle when the branch instruction is executed, i.e. the cycle when the branch destination address is determined, the CPU 101 outputs the branch destination address indicated by the branch instruction obtained by decoding and makes a fetch request. It is thus necessary to set all the main memories to the normal mode that allows access by this cycle. As described earlier, because it takes a time for the main memory to return from the standby mode to the normal mode, it is necessary to make the standby release of the main memories at the timing earlier than the first cycle when the branch instruction is executed by a time required for the resumption of the main memory.

On the other hand, because the current consumption of the main memory increases as the standby release is earlier, it is preferred that a time interval between the standby release and the first cycle when the branch instruction is executed is the number of cycles corresponding to a time needed for the resumption of the main memory. In this exemplary embodiment, because a time needed for the resumption of the main memory is eight cycles, the predetermined value K is set to eight.

The state 2 is maintained until the address match signal 215 is activated. When the address match signal 215 is activated, the state is changed to the state 3 of "normal fetch (branch preparation)". In this state, all the main memories are in the normal mode so as to prepare for the start of execution of the branch instruction.

The state 3 is maintained until the fetch initialization signal 134 is activated, i.e. until the execution of the branch instruction is started. After the start of execution of the branch instruction, an instruction corresponding to the branch destination address is fetched from the main memory. The next state differs depending on whether a branch instruction is detected from the instruction.

As shown in FIG. 5, when the fetch initialization signal 134 is activated and the branch match signal 129 is inactive in the state 3, the state is changed to the state 4 of "branch fetch (without branch)". This is the case where another branch instruction is not detected during execution of the branch instruction.

The state 4 exists only during the branch latency period when the fetch initialization shift signal 219 is active. The state is changed to the state 1 when the fetch initialization shift signal 219 is inactivated. Because the main memory having the branch destination address of the branch instruction started to be executed is determined when the fetch initialization shift signal 219 is inactivated, only the branch destination main memory remains in the normal mode, and the other main memories enter the standby mode.

On the other hand, when the fetch initialization signal 134 is activated and the branch match signal 129 is activated in the state 3, the state is changed to the state 5 of "branch fetch (with branch)". This is the case where the execution of the branch instruction is started and a branch instruction is detected from the instruction corresponding to the branch destination address.

The state 5 exists only during the branch latency period when the fetch initialization shift signal 219 corresponding to the currently executed branch instruction is active. The state is changed to the state 3 when the fetch initialization shift signal 219 is inactivated. The state is changed back to the state 5 when the execution of a new branch instruction is started. After that, the state is changed again to the state 3 when the fetch initialization shift signal 219 corresponding to the new branch instruction is inactivated.

When a new branch instruction is detected at the start of execution of the branch instruction, all the main memories remain in the normal mode even when the fetch initialization shift signal 219 corresponding to the previous branch instruction is inactivated. Then, when the fetch initialization shift signal 219 corresponding to the new branch instruction is inactivated, the main memories other than the branch destination main memory are changed from the normal mode to the standby mode.

The operation of the memory control circuit 200 is described hereinafter in further detail using a specific operation example.

Figure 6:
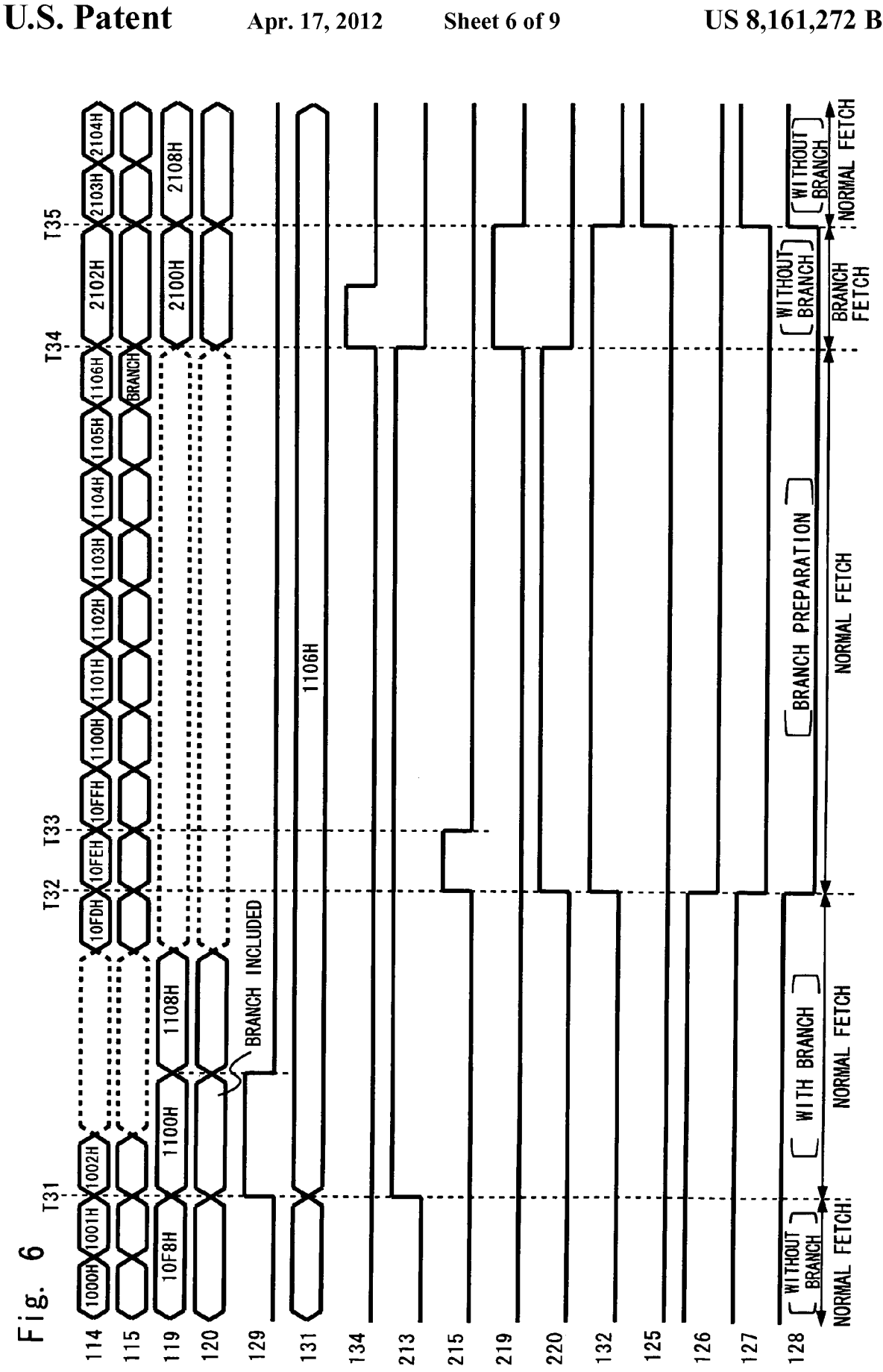
FIG. 6 is a timing chart showing an example of an operation in the microcomputer shown in FIG. 3.

FIG. 6 is a timing chart in the case where the state 5 of "branch fetch (with branch)" does not occur.

Referring to FIG. 6, the fetch address control circuit 103 first fetches an instruction at the fetch address 114 from the cache memory 102 and prefetches an instruction from the main memory 107.

At 31 when a branch instruction is detected from the main fetch code 120, the branch match signal 129 is activated, and the branch instruction 131 obtained from the higher-order address 119 and the branch instruction lower-order address 130 at that time is held by the address hold circuit 112 that is enabled by the address hold enable signal 133. At the same time, the address comparison signal 213 is activated, and the comparator 210 starts comparison of addresses.

At T32 when the branch instruction address 131 and the added address 214 obtained by adding "8" to the fetch address 114 match, the address match signal 215, the address match hold output signal 220 and the branch preparation signal 132 are activated. At the same time as when the branch preparation signal 132 is activated, the main memory standby signals 126 to 128 are inactivated, and the standby of the main memories 108 to 110 is released.

At T34 when the fetch from the branch destination address is started, the fetch initialization signal 134 is activated, and the address comparison signal 213 and the address match hold output signal 220 are reset. Further, the fetch initialization shift signal 219 is activated during the branch latency period.

At T35 when the branch fetch is changed to the normal change, the branch preparation signal 132 is inactivated, and the main memory standby signals 125, 127 and 128 of the main memories other than the main memory 108 indicated by the higher-order address 119 are activated, so that the main memories 107, 109 and 110 enter the standby mode.

Figure 7:
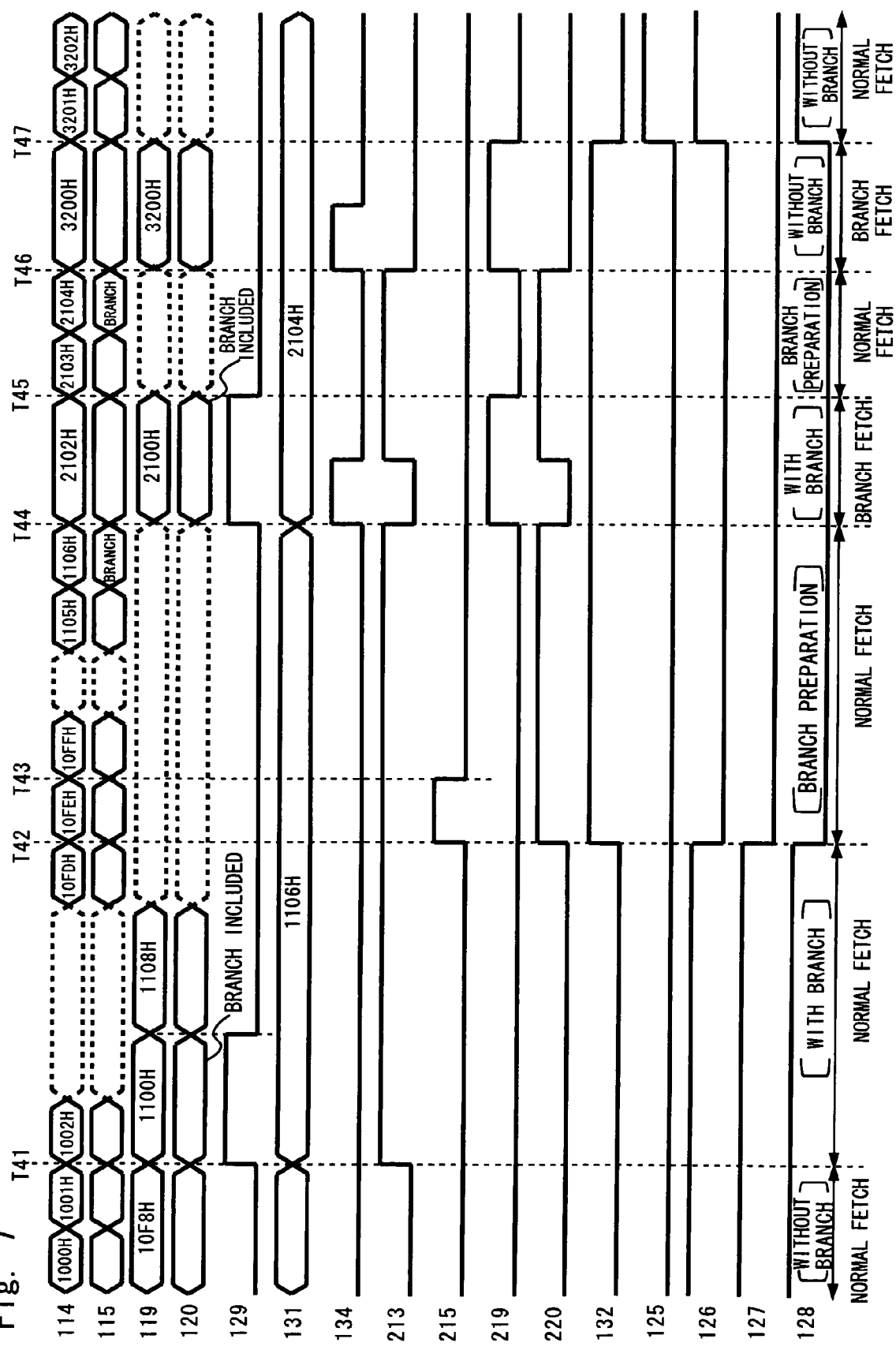
FIG. 7 is another timing chart showing an example of an operation in the microcomputer shown in FIG. 3.

FIG. 7 is a timing chart in the case where the state 5 occurs. The same parts as those in FIG. 6 are not described repeatedly.

A branch instruction is detected at T41, the branch preparation signal 132 is activated at T42, and the fetch from the branch destination address is started at T44.

At T44 when a branch instruction is detected again from the main fetch code 120, the branch match signal 129 is activated, and therefore the address comparison signal 213 that has been inactivated once is activated again. At this time, because the fetch initialization shift signal 219 is active, the selector 216 selects the address comparison signal 213, and the address match hold output signal 220 is activated, so that the branch preparation signal 132 remains active after T45.

At T46, the branch fetch is performed, and because a branch instruction is not detected from the main fetch code 120 at this time, the branch preparation signal 132 is inactivated at T47, and the main memory standby signals 125, 126 and 128 are activated.

The microcomputer 100 according to the exemplary embodiment is the implementation of the principles of the present invention, and it is possible to obtain the advantage obtained by the microcomputer 50.

In the recent microcomputer, a plurality of instructions (instruction sequence) are read out at a time by the prefetch. In this exemplary embodiment, when a branch instruction is detected from the prefetched instruction sequence, its branch destination address is calculated and held, and an added address is obtained by adding the minimum number of cycles necessary for the standby release of the main memory to the instruction address output from the CPU. Then, if the held branch destination address and the added address match, the standby release of all the main memories is made. Because all the main memories are thereby in the normal mode when the branch destination address indicated by the branch instruction is determined, the CPU can fetch the instruction at the branch destination address regardless of which main memory it is without waiting, thereby preventing the degradation of performance.

As the value K added to the instruction address output from the CPU is smaller, the standby release of the main memory becomes earlier, and if the value K larger than the above minimum number of cycles, a waiting time occurs in the memory reading of the CPU. Thus, the memory control circuit 200 sets the value K to the minimum necessary number of cycles for the standby release of the main memory so as to ensure the best balance between the securing of the CPU performance and the effect of reducing the power consumption of the memory.

It is, of course, possible to obtain more advantage than the related art in terms of preventing the degradation of the CPU performance with use of a given integer K of 1 or above that is smaller than the minimum necessary number of cycles.

Second Exemplary Embodiment

Figure 8:
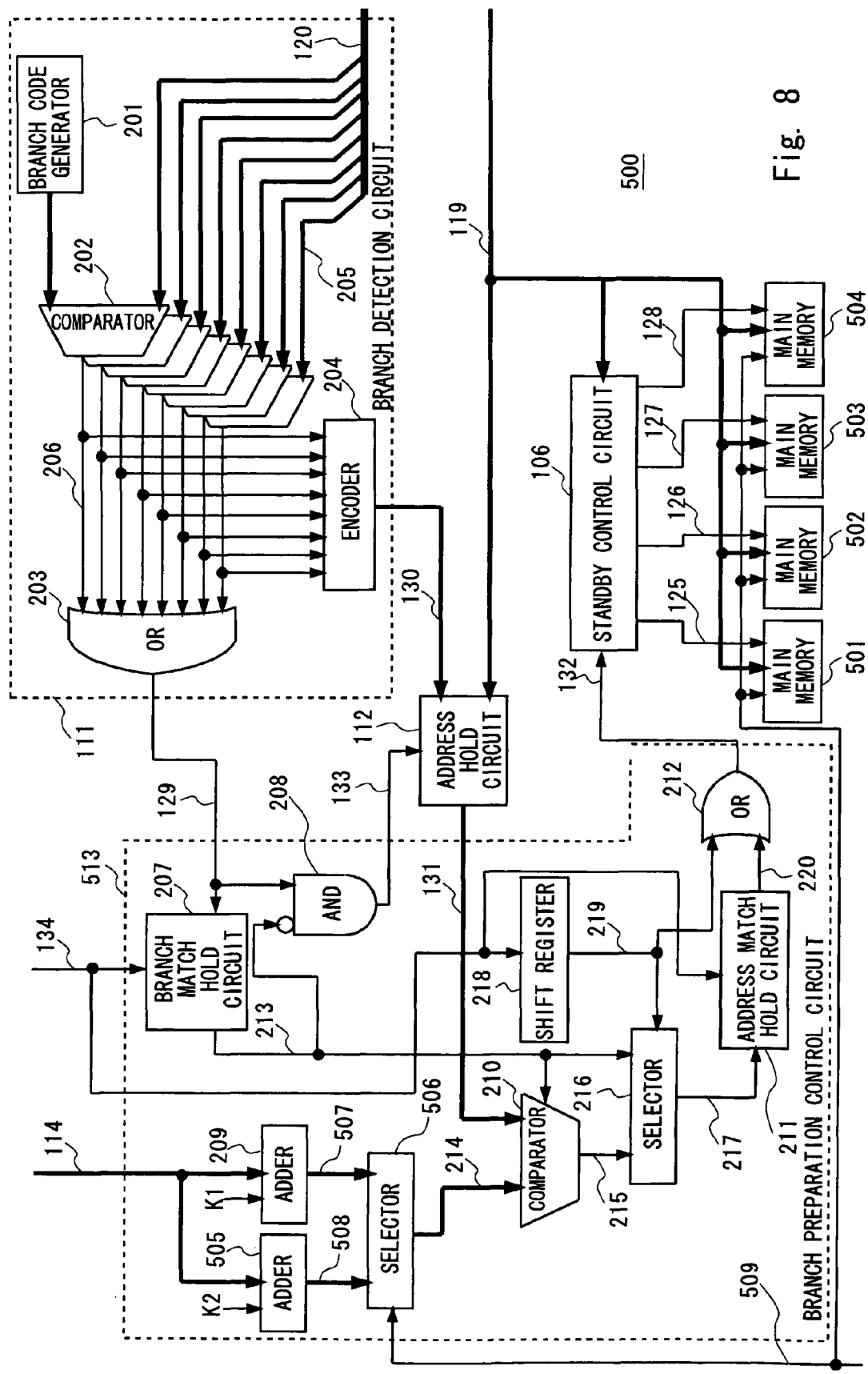
FIG. 8 is a view showing an integrated circuit in a microcomputer according to a second exemplary embodiment of the present invention.
Figure 9:
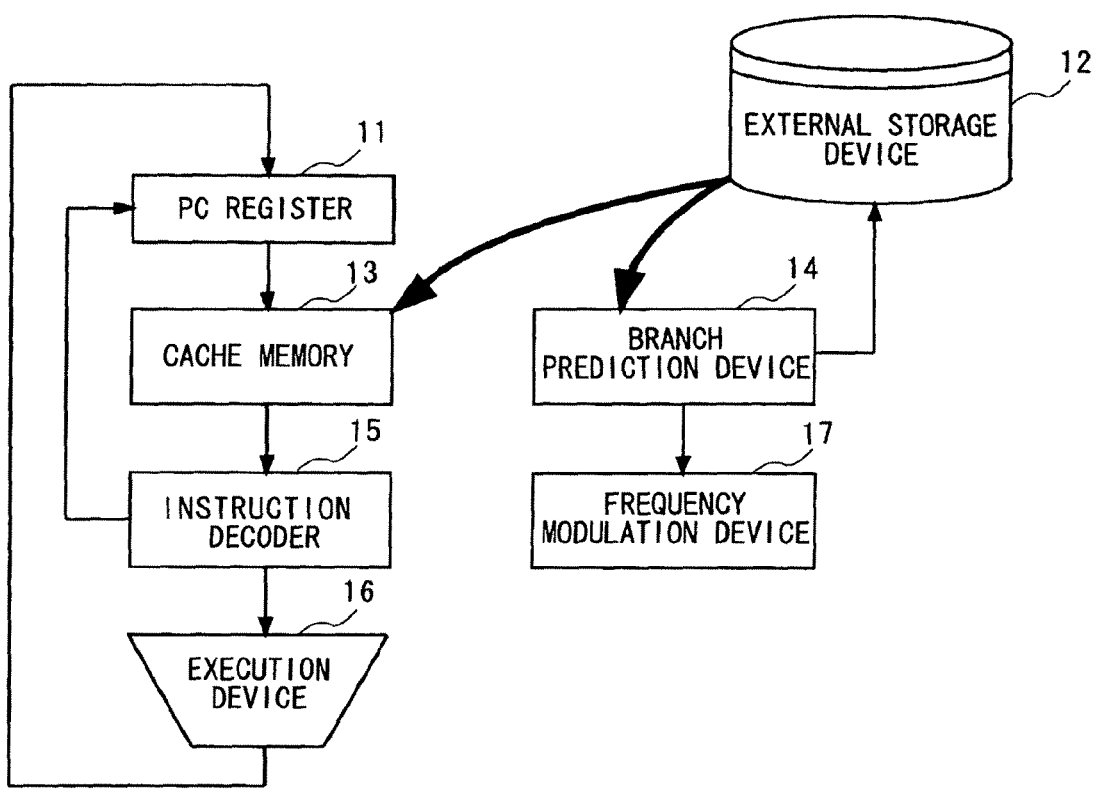
FIG. 9 is a view showing a related art.

An integrated circuit 500 shown in FIG. 8 corresponds to the memory control circuit 200 and each main memory in the microcomputer 100 shown in FIG. 3. The microcomputer to which such an integrated circuit is applied is described hereinafter as a second exemplary embodiment of the present invention. To avoid redundant explanation, the description and illustration of the elements other than the integrated circuit 500 are not provided below. In FIG. 8, the elements having the same configuration or function as those in the memory control circuit 200 shown in FIG. 4 are denoted by the same reference symbols.

A standby mode selection signal 509 for a selection among a plurality of standby modes is connected to main memories 501 to 504 shown in FIG. 8. A branch preparation control circuit 513 is configured by adding an adder 505 and a selector 506 to the branch preparation control circuit 113 of the memory control circuit 200. The selector 506 selects either output of the adder 209 or the adder 505 as the added address 214 to be input to the comparator 210 according to the standby mode selection signal 509. Different values are added to the adder 505 and the adder 209. For example, K1(=8) is added to the adder 209, and K2(=4) is added to the adder 505.

The microcomputer to which the integrated circuit 500 is applied operates in the same manner as the microcomputer 100 when the standby mode selection signal 509 is set so as to select the adder 209.

On the other hand, when the standby mode selection signal 509 is set so as to select the adder 505, in the operation of the microcomputer to which the integrated circuit 500 is applied, the timing of T32 and T33 in FIG. 6 showing the exemplary operation of the microcomputer 100 is changed from eight cycles before T34 to four cycles before T34 on the instruction address bus 114, for example.

In this exemplary embodiment, if each main memory has a plurality of standby modes, it is possible to further reduce the power consumption of the main memory. For example, the main memories 501 to 504 are compatible with a low-current standby mode and an intermediate-current standby mode.

In the low-current standby mode, while a standby release time corresponding to eight read cycles of the main memories 501 to 504 is required, the current consumption is low.

On the other hand, in the intermediate-current standby mode, while a standby release time corresponding to only four read cycles of the main memories 501 to 504 is required, the current consumption is higher than that in the low-current standby mode.

Because the reduced amount of power consumption of the main memory is affected by the proportion of branch instructions to all instructions in a user program, if the proportion of branch instructions to all instructions is large, the power consumption when executing the user program can be smaller by selecting the intermediate-current standby mode. In the configuration that allows a user to make a selection among a plurality of standby modes as in the microcomputer of this exemplary embodiment, a user can select the setting with lower power consumption.

Further, the selection of a standby mode may be automated by a computer analyzing the proportion of branch instructions to all instructions in the user program and outputting the standby mode selection signal 509 according to an analysis result.

While the invention has been described in terms of several exemplary embodiments, those skilled in the art will recognize that the invention can be practiced with various modifications within the spirit and scope of the appended claims and the invention is not limited to the examples described above.

Further, the first and second exemplary embodiments can be combined as desirable by one of ordinary skill in the art.

Further, the scope of the claims is not limited by the exemplary embodiments described above.

Furthermore, it is noted that, Applicant's intent is to encompass equivalents of all claim elements, even if amended later during prosecution.

What is claimed is:

1. A memory control circuit comprising:
a branch detection section to detect a branch instruction from an instruction fetched from a memory unit including a plurality of operation modes; and
a mode control section to change an operation mode of the memory unit according to a detection result by the branch detection section,
wherein:
the memory unit comprises a plurality of memories,
the plurality of operation modes comprise a normal mode allowing access and a standby mode consuming a lower power than the normal mode, and
in response to the detection of a branch instruction from an instruction fetched from any one of the plurality of memories, the mode control section makes standby release of the other memories,
the branch detection section detects a branch instruction from an instruction prefetched according to a fetch address output from a central processing unit (CPU), the fetch address being an instruction address to be fetched,
the mode control section makes the standby release at a timing determined by a timing when the prefetched branch instruction is fetched and a predetermined time, and
the mode control section calculates the timing to make the standby release from the instruction address of the branch instruction and the predetermined time, and makes the standby release when the fetch address output from the CPU becomes an address indicating the timing to make the standby release.

2. The memory control circuit according to claim 1, wherein
the predetermined time is determined by a time needed for the plurality of memories to return to the normal mode after the standby release is made.

3. The memory control circuit according to claim 2, wherein
the mode control section calculates the timing to make the standby release from the instruction address of the branch instruction and the predetermined time, and makes the standby release when the fetch address output from the CPU becomes an address indicating the timing to make the standby release.

4. The memory control circuit according to claim 3, wherein:
the branch detection section detects the branch instruction from an instruction sequence including a plurality of instructions prefetched from a first address according to the fetch address output from the CPU, and
the mode control section comprises:
an address hold section to generate and hold the instruction address of the branch instruction from the first address and a second address corresponding respectively to the plurality of instructions;
an addition section to add a value K (K is an integer of 1 or above) indicating the number of cycles corresponding to the predetermined time and the fetch address output from the CPU to obtain an added address; and
a standby control section to make the standby release when the instruction address of the branch instruction held by the address hold section and the added address obtained by the addition section match.

5. The memory control circuit according to claim 1, wherein:
the branch detection section detects the branch instruction from an instruction sequence including a plurality of instructions prefetched from a first address according to the fetch address output from the CPU, and
the mode control section comprises:
an address hold section to generate and hold the instruction address of the branch instruction from the first address and a second address corresponding respectively to the plurality of instructions;
an addition section to add a value K (K is an integer of 1 or above) indicating the number of cycles corresponding to the predetermined time and the fetch address output from the CPU to obtain an added address; and
a standby control section to make the standby release when the instruction address of the branch instruction held by the address hold section and the added address obtained by the addition section match.

6. The memory control circuit according to claim 5, wherein:
the plurality of memories have a plurality of standby modes each having a different length of the predetermined time needed to return to the normal mode after the standby release is made, and
the addition section generates the added address by adding a value selected from the value K comprising a plurality of values corresponding respectively to the plurality of standby modes according to a standby mode selection signal and the fetch address output from the CPU.

7. The memory control circuit according to claim 6, wherein
upon determination of a branch destination address of the branch instruction, the standby control section changes the memories different from the memory corresponding to the branch destination address into a standby mode of the plurality of standby modes indicated by the standby mode selection signal.

8. A memory control circuit comprising:
a branch detection section to detect a branch instruction from an instruction fetched from a memory unit including a plurality of operation modes; and
a mode control section to change an operation mode of the memory unit according to a detection result by the branch detection section, wherein:
the memory unit comprises a plurality of memories,
the plurality of operation modes comprise a normal mode allowing access and a standby mode consuming a lower power than the normal mode,
in response to the detection of a branch instruction from an instruction fetched from any one of the plurality of memories, the mode control section makes standby release of the other memories,
upon determination of a branch destination address of the branch instruction, the mode control section changes the memories different from the memory corresponding to the branch destination address into the standby mode,
the branch detection section detects a branch instruction from an instruction prefetched according to a fetch address output from a central processing unit (CPU), the fetch address being an instruction address to be fetched,
the mode control section makes the standby release at a timing determined by a timing when the prefetched branch instruction is fetched and a predetermined time, and
the mode control section calculates the timing to make the standby release from the instruction address of the branch instruction and the predetermined time, and makes the standby release when the fetch address output from the CPU becomes an address indicating the timing to make the standby release.

9. The memory control circuit according to claim 8, wherein
the predetermined time is determined by a time needed for the plurality of memories to return to the normal mode after the standby release is made.

10. The memory control circuit according to claim 9, wherein
the mode control section calculates the timing to make the standby release from the instruction address of the branch instruction and the predetermined time, and makes the standby release when the fetch address output from the CPU becomes an address indicating the timing to make the standby release.

11. The memory control circuit according to claim 8, wherein:
the branch detection section detects the branch instruction from an instruction sequence including a plurality of instructions prefetched from a first address according to the fetch address output from the CPU, and
the mode control section comprises:
an address hold section to generate and hold the instruction address of the branch instruction from the first address and a second address corresponding respectively to the plurality of instructions;
an addition section to add a value K (K is an integer of 1 or above) indicating the number of cycles corresponding to the predetermined time and the fetch address output from the CPU to obtain an added address; and
a standby control section to make the standby release when the instruction address of the branch instruction held by the address hold section and the added address obtained by the addition section match.

12. An integrated circuit comprising:
a central processing unit (CPU);
a memory unit including a plurality of operation modes; and
a memory control section, wherein the memory control section comprises:
a branch detection section to detect a branch instruction from an instruction fetched from the memory unit by the CPU; and
a mode control section to change an operation mode of the memory unit according to a detection result by the branch detection section,
wherein:
the memory unit comprises a plurality of memories,
the plurality of operation modes comprise a normal mode allowing access and a standby mode consuming a lower power than the normal mode,
in response to the detection of a branch instruction from an instruction fetched from any one of the plurality of memories, the mode control section makes standby release of the other memories,
the memory unit comprises a plurality of memories,
the plurality of operation modes comprises a normal mode allowing access and a standby mode consuming a lower power than the normal mode,
in response to detection of a branch instruction from an instruction fetched from any one of the plurality of memories, the mode control section makes standby release of the other memories,
upon determination of a branch destination address of the branch instruction, the mode control section changes the memories different from the memory corresponding to the branch destination address into the standby mode,
the branch detection section detects a branch instruction from an instruction prefetched according to a fetch address output from the CPU, the fetch address being an instruction address to be fetched,
the mode control section makes the standby release at a timing determined by a timing when the prefetched branch instruction is fetched and a predetermined time,
the predetermined time is determined by a time needed for the plurality of memories to return to the normal mode after the standby release is made, and
the mode control section calculates the timing to make the standby release from the instruction address of the branch instruction and the predetermined time, and makes the standby release when the fetch address output from the CPU becomes an address indicating the timing to make the standby release.

13. The integrated circuit according to claim 12, wherein:
the branch detection section detects the branch instruction from an instruction sequence including a plurality of instructions prefetched from a first address according to the fetch address output from the CPU, and
the mode control section comprises:
an address hold section to generate and hold the instruction address of the branch instruction from the first address and a second address corresponding respectively to the plurality of instructions;
an addition section to add a value K (K is an integer of 1 or above) indicating the number of cycles corresponding to the predetermined time and the fetch address output from the CPU to obtain an added address; and
a standby control section to make the standby release when the instruction address of the branch instruction held by the address hold section and the added address obtained by the addition section match.

14. The integrated circuit according to claim 13, wherein:
the plurality of memories have a plurality of standby modes each having a different length of the predetermined time needed to return to the normal mode after the standby release is made, and
the addition section generates the added address by adding a value selected from the value K comprising a plurality of values corresponding respectively to the plurality of standby modes according to a standby mode selection signal and the fetch address output from the CPU.

15. The integrated circuit according to claim 14, wherein upon determination of a branch destination address of the branch instruction, the standby control section changes the memories different from the memory corresponding to the branch destination address into a standby mode of the plurality of standby modes indicated by the standby mode selection signal.

* * * * *